United States Patent [19]

Kaneshige

[11] Patent Number: 5,211,845
[45] Date of Patent: May 18, 1993

[54] FILTER HOUSING

[75] Inventor: Noritsugu Kaneshige, Nara, Japan

[73] Assignee: Aska Corporation, Osaka, Japan

[21] Appl. No.: 839,893

[22] Filed: Feb. 25, 1992

[30] Foreign Application Priority Data

Oct. 16, 1991 [JP] Japan ................................. 3-267499

[51] Int. Cl.⁵ ............................................. B01D 35/18
[52] U.S. Cl. .................................... 210/186; 210/184; 219/10.51
[58] Field of Search ............... 210/184, 185, 186, 222; 219/10.51, 10.491, 10.65

[56] References Cited

U.S. PATENT DOCUMENTS

| | | | |
|---|---|---|---|
| 2,075,622 | 3/1937 | Nehlsen | 219/10.51 |
| 2,407,562 | 9/1946 | Lofgren | 219/10.51 |
| 3,200,948 | 8/1965 | Kasten | 210/184 |
| 3,307,009 | 2/1967 | Schroeder | 219/10.51 |
| 3,518,410 | 6/1970 | Dillarstone | 219/10.51 |
| 3,816,687 | 6/1974 | Heitner | 219/10.51 |
| 4,388,185 | 6/1983 | Ott et al. | 210/184 |
| 4,529,866 | 7/1985 | Leary | 210/186 |
| 4,753,724 | 6/1988 | Womble | 210/184 |
| 4,962,291 | 10/1990 | Fujita et al. | 219/10.491 |

*Primary Examiner*—Peter Hruskoci
*Assistant Examiner*—Robert James Popovics
*Attorney, Agent, or Firm*—Wenderoth, Lind & Ponack

[57] ABSTRACT

A filter housing includes a filter body having an opening, and a lid detachably mounted on the body to close the opening of the body. The lid is provided with a jacket in which is sealed a vapor-liquid two-phase heating medium. An electromagnetic induction heating mechanism having an induction coil is provided to heat the heating medium to vaporize it and heat the lid with the vaporized heating medium. The heating mechanism is fixedly mounted on the filter body so that only the lid needs to be detached from the body when exchanging a filter element.

5 Claims, 3 Drawing Sheets

FILTER HOUSING

Background of The Invention

This invention relates to a filter housing having a detachable lid for opening and closing the opening of a housing so that filter elements can be put in and taken out easily, and more specifically to a heating filter housing in which the lid can be put on and taken off easily and the filter elements can be exchanged easily.

A filter housing, especially one in which a polymer (synthetic resin), is filtered is required to keep constant the temperature of the material being filtered and therefore must be heated not only at its bottom and midsection but at its top. This is because a polymer hardens if its temperature decreases too much and tends to deteriorate by heat too much. Thus, the temperature has to be kept constant at all times. Further, since such a housing has a detachable lid for facilitating an exchange of filter elements, it is desired to improve the method of heating the top lid.

Heretofore, the following methods have been employed as means for heating the lids of filter housing:

(1) feeding the same heating medium as the heating medium being fed to the bottom and midsection of the filter housing body to the lid from a separately installed heating device, and removing a piping connecting the heating device to the lid every time the lid is mounted or dismounted, (2) heating the lid with an electric heater separately from the bottom and midsection of the housing body, (3) heating only the bottom and midsection of the filter housing body, while keeping the lid unheated, to keep it warm only by the heat conducted from the bottom and midsection of the body.

The inlet and outlet of a fluid to be filtered are provided on the housing body and the lid, respectively. In other words, the lid is connected not only to the housing body but also to the inlet and outlet pipings. Thus, in order to exchange the filter elements, the lid has to be disconnected from the pipings for the fluid inlet and outlet.

Of the above-described conventional heating methods, the first method involves draining a hot heating medium when mounting and dismounting the pipings, which is very dangerous.

The second method requires no draining of a hot heating medium and thus is safe. But an electric heater cannot heat the lid uniformly and cannot be used in an area to be kept free from explosions.

The third method is convenient but there is a fear that the temperature may drop since the lid is not heated directly.

SUMMARY OF THE INVENTION

It is an object of this invention to provide a heating filter housing which is free of such problems as danger in handling, non-uniformity in temperature and temperature drop, which can heat the lid uniformly and thus can maintain a high quality of the fluid being filtered, and in which the lid can be mounted and dismounted easily whereby the filter element can be exchanged easily.

Another object is to provide a heating filter housing in which both the inlet and outlet of the fluid to be filtered are mounted on the housing body and thus only the lid needs to be mounted and dismounted when exchanging the filter elements.

In order to solve the above problems, there is provided a filter housing comprising a body having an opening, a lid detachably mounted on the body to close the opening of the body, the lid being provided with a jacket in which is sealed a vapor-liquid two-phase heating medium, and an electromagnetic induction heating means having an induction coil for heating the heating medium to heat the lid.

The electromagnetic induction heating means is fixedly mounted on the body and both an inlet and an outlet for the liquid to be filtered are provided on the body, whereby the lid having the jacket is readily detachable from the housing body.

When the electromagnetic coil of the electromagnetic induction heating mechanism is excited by an alternating power supply, an alternating field is produced, thus inducing a current in the reservoir of the heating medium. This current produces Joule's heat at the jacket of the lid defining the reservoir. This heat in turn heats the heating medium in the jacket, allowing the vapored medium to flow toward the surrounding low-temperature portions. The medium thus condenses while increasing the temperature at the low-temperature portions by imparting latent heat thereto. Since such an exchange of latent heat continues as long as there exists a temperature difference, the temperature of the lid can be always kept constant.

According to this invention, the heating medium for heating the lid is sealed in the jacket. The lid is not connected to any other device constituting the filter housing jacket. Thus, the lid can be mounted and dismounted safely and easily, because there is no need to drain the hot heating medium when exchanging the filter elements by mounting and dismounting the lid.

Further, unlike electric heaters, when heating the heating medium with the electromagnetic induction heating mechanism, an abnormal temperature rise will never occur.

BRIEF DESCRIPTION OF THE DRAWINGS

Other features and objects of the present invention will become apparent from the following description taken with reference to the accompanying drawings, in which.

DETAILED DESCRIPTION OF THE PREFERRED EMBODIMENTS

Figure 1:
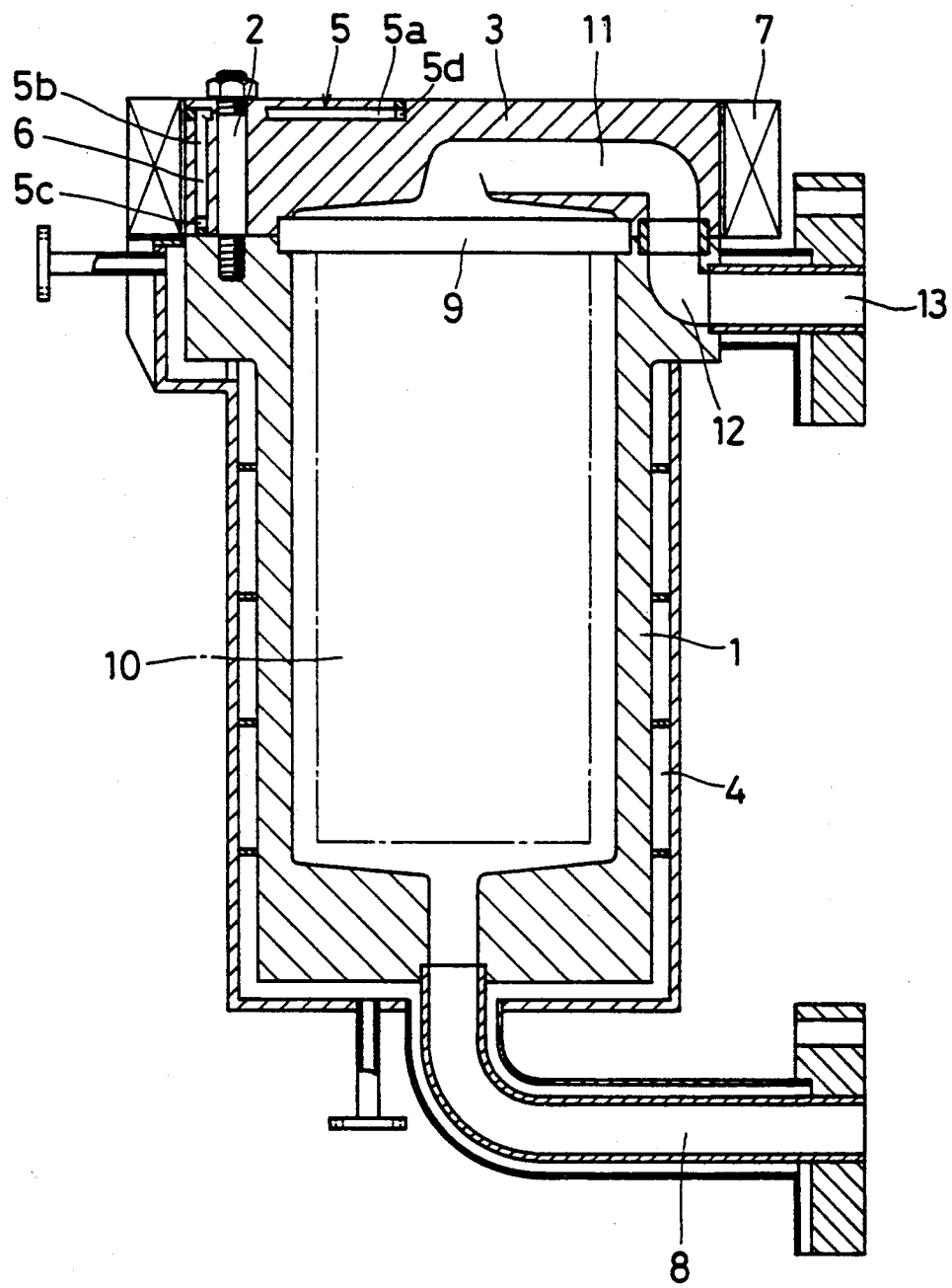
FIG. 1 is a vertical sectional front view of the heating filter housing embodying this invention.

In the figures, numeral 1 designates a body of heating filter housing. It has a top opening which is closed by a lid 3 detachably mounted on the body 1 by means of e.g. a bolt 2.

The housing body 1 has a jacket defining a chamber 4 through which heating medium passes for heating the bottom and midsection of the body. A portion of the lid 3, constituting a jacket, is provided with a great number of small holes 5. A heating medium is sealed in the small holes 5.

Figure 2:
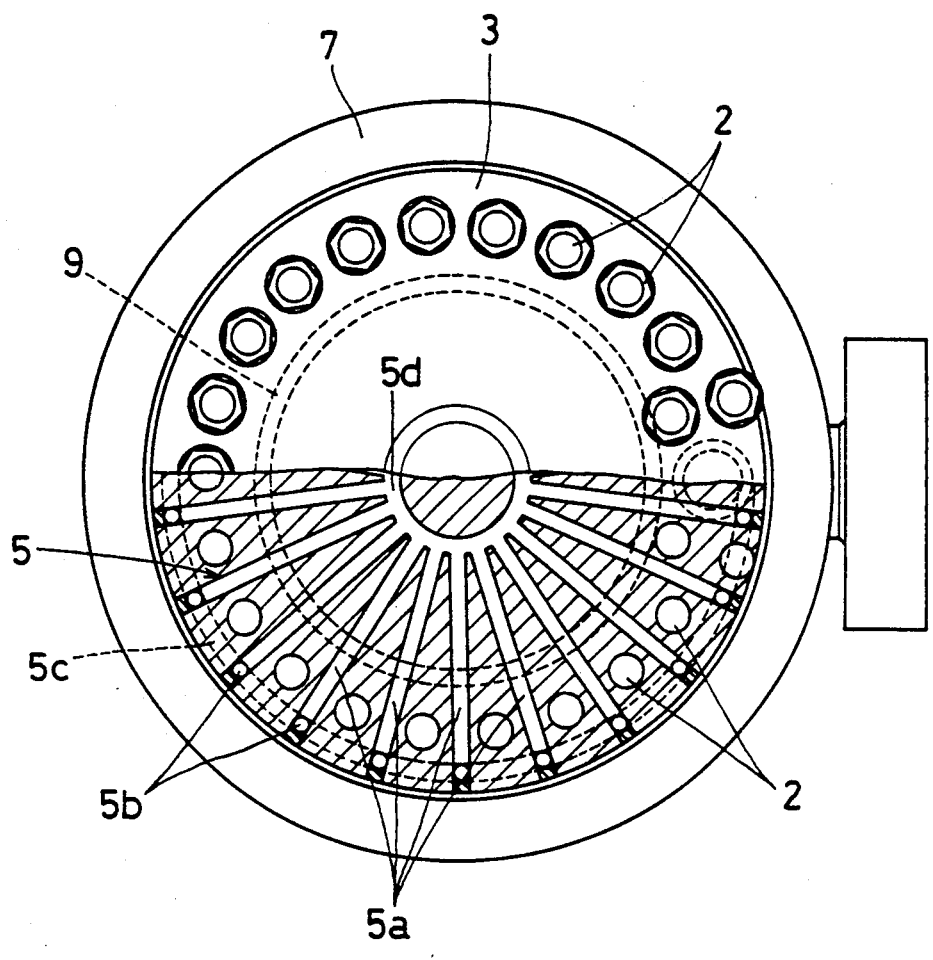
FIG. 2 is a partially cutaway plan view of the same.
Figure 3:
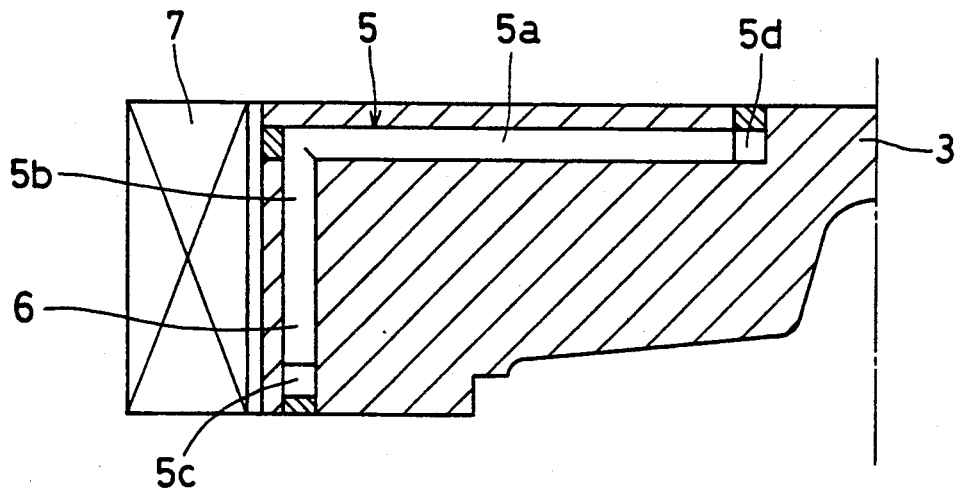
FIG. 3 is an enlarged vertical sectional view of the portion of the lid, i.e. jacket, defining the small holes in the lid.
Figure 4:
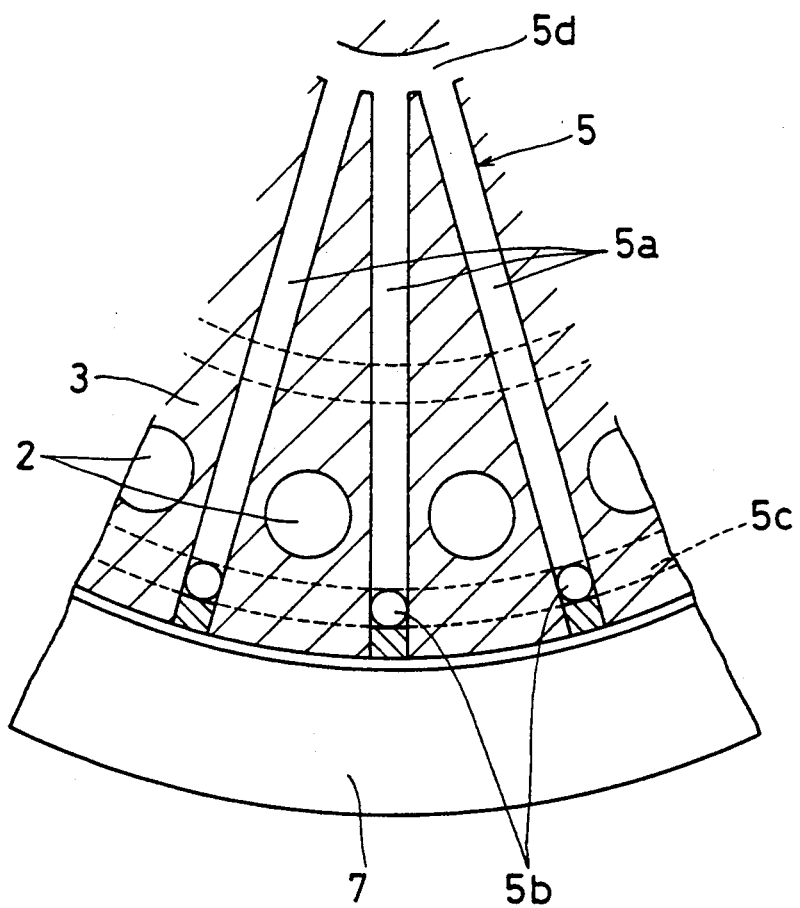
FIG. 4 is a horizontal sectional view of the same.

As shown in FIGS. 2-4, the small holes 5 comprise radially extending radial holes 5a formed on top of the lid 3, vertical holes 5b formed near the outer periphery of the lid 3 and communicating with the radial holes 5a, an annular hole 5c through which the bottom ends of the vertical holes 5b communicate with each other, and an annular hole 5d through which the inner ends of the lateral holes 5a communicate with each other. The vertical holes 5b and the annular hole 5c serve as a fluid reservoir 6, so that the heating medium therein can circulate throughout the holes. The jacket forms a great number of small holes in order to increase the heated area. A vapor-liquid two-phase heating medium is sealed under vacuum in each small hole 5.

Outside the plurality of small holes 5, an electromagnetic induction heating mechanism 7 is fixedly mounted on the housing body 1 so as to surround the outer periphery of the lid 3. The heating mechanism 7 comprises mainly an induction coil and a core on which the induction coil is wound.

The jacket of the housing body 1 may be heated by induction heating in the same manner as the lid 3 is heated. Otherwise a heating medium may be used which is heated by a separately installed ordinary heating device.

The fluid to be filtered is admitted into the housing body 1 through an inlet nozzle 8 mounted on the housing body. After having been filtered through a filter element 10 mounted on an element mounting plate 9, the fluid will flow through a passage 11 in the lid 3 and into a passage 12 in the housing body 1. Then it is discharged through an outlet nozzle 13 mounted on the housing body 1. The filter element 10 may be of a bucket type, tube type, candle type or disk type or any type that can attain the same filtering effect. The inlet nozzle and the outlet nozzle for the fluid to be filtered may be provided in the opposite way to the above.

When the electromagnetic induction heating mechanism 7 is activated, i.e. when the electromagnetic coil is energized by an alternating power supply, an alternating field is produced. This induces a current at the jacket of the lid defining the plurality of small holes 5 and hance, the fluid reservoir 6, and at the remaining wall portion of the lid 3, thus producing Joule's heat at the respective portions. The portions of the lid are heated by this heat.

The heating medium in the fluid reservoir 6 which is in a liquid phase is heated by the heat in the fluid reservoir 6 and vaporizes. The vapor thus produced will flow to the low-temperature regions in the small holes 5. When it touches low-temperature parts, it condenses into a liquid phase, producing a latent heat. The low-temperature parts are thus heated. The condensed heating medium returns to the fluid reservoir 6. This cycle is repeated thereafter.

By such exchange of latent heat of the heating medium, the entire wall of the lid 3 is uniformly heated and thus the temperature of the lid 3 becomes uniform. The temperature can be controlled simply by controlling the impressed voltage of the electromagnetic coil or its frequency. The response speed is sufficiently high.

Since the heating medium for heating the lid 3 is sealed in the small holes 5 and the lid is not connected to any other device, it is not necessary to drain the high-temperature heating medium when mounting and dismounting the lid 3. Thus, the lid can be mounted and dismounted safely and easily.

The electromagnetic induction heating mechanism 7 may be secured to the outside of the lid but preferably it should be mounted on the body. By so doing, it becomes unnecessary to pull lead wires about when mounting and dismounting the lid and thus the lid can be mounted and dismounted more easily.

Further, with this method, unlike electric heaters, an abnormal temperature rise will never occur.

What is claimed is:

1. A filter housing comprising: a body defining an opening and an interior; an inlet communicating with the interior of said body and through which material to be filtered in the housing can be introduced into said body; an outlet communicating with the interior of said body and through which filtrate is discharged from the housing; a lid detachably mounted on said body and closing said opening of said body, said lid including a jacket and a vapor-liquid two-phase heating medium sealed in said jacket; and an electromagnetic induction heating means, including an induction coil, for heating said heating medium to heat said lid.

2. A filter housing as claimed in claim 1, wherein said electromagnetic induction heating means is fixedly mounted on said body, and said inlet and said outlet are provided on said body.

3. A filter housing as claimed in claim 2, wherein said lid has a passageway therein extending between the interior of said body and said outlet.

4. A filter housing as claimed in claim 1, wherein said jacket comprises a peripheral portion of said lid defining a plurality of holes in the lid, said heating medium being sealed in said holes.

5. A filter housing as claimed in claim 4, wherein said holes include a first annular hole, a plurality of radial holes extending from said first annular hole, a plurality of vertical holes extending vertically from said radial holes, and a second annular hole extending from said vertical holes.

* * * * *